(12) United States Patent
Owen

(10) Patent No.: US 9,092,048 B1
(45) Date of Patent: Jul. 28, 2015

(54) SYNCHRONIZED POWER DELIVERY

(75) Inventor: David Owen, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 456 days.

(21) Appl. No.: 13/525,123

(22) Filed: Jun. 15, 2012

(51) Int. Cl.
  *G06F 1/32* (2006.01)
  *G06F 1/00* (2006.01)
  *G06F 1/26* (2006.01)

(52) U.S. Cl.
  CPC ... *G06F 1/00* (2013.01); *G06F 1/26* (2013.01)

(58) Field of Classification Search
  USPC ......... 713/300, 310, 320, 321, 322, 323, 324, 713/330, 340, 375
  See application file for complete search history.

(56) References Cited

U.S. PATENT DOCUMENTS

| | | | | |
|---|---|---|---|---|
| 8,148,958 B2 * | 4/2012 | Barrenscheen | ............... | 323/272 |
| 8,365,001 B2 * | 1/2013 | Ma | ............................. | 713/324 |
| 2009/0199033 A1 * | 8/2009 | Borkar et al. | ................. | 713/340 |
| 2010/0202555 A1 * | 8/2010 | Takahashi et al. | ............ | 375/292 |
| 2011/0310954 A1 * | 12/2011 | Sawaoka et al. | ............. | 375/238 |

* cited by examiner

*Primary Examiner* — Jaweed A Abbaszadeh
*Assistant Examiner* — Keshab Pandey
(74) *Attorney, Agent, or Firm* — Shumaker & Sieffert, P.A.

(57) ABSTRACT

This disclosure describes techniques by which power demand requests from an electronic component are synchronized by a power manager within the electronic component with control algorithms internally used by a power supply to deliver power. Timing characteristics from an internal control signal for the power supply, such as a pulse width modulated (PWM) signal, may be provided to one or more electronic components that receive power from the power supply. A power manager within an electronic component may synchronize the timing of power change requests based on timing characteristics of the control signal. This may reduce the energy and time needed to respond to dynamic load changes required by the electronic component. The faster response time may allow larger power changes from the electronic component to be processed.

18 Claims, 5 Drawing Sheets

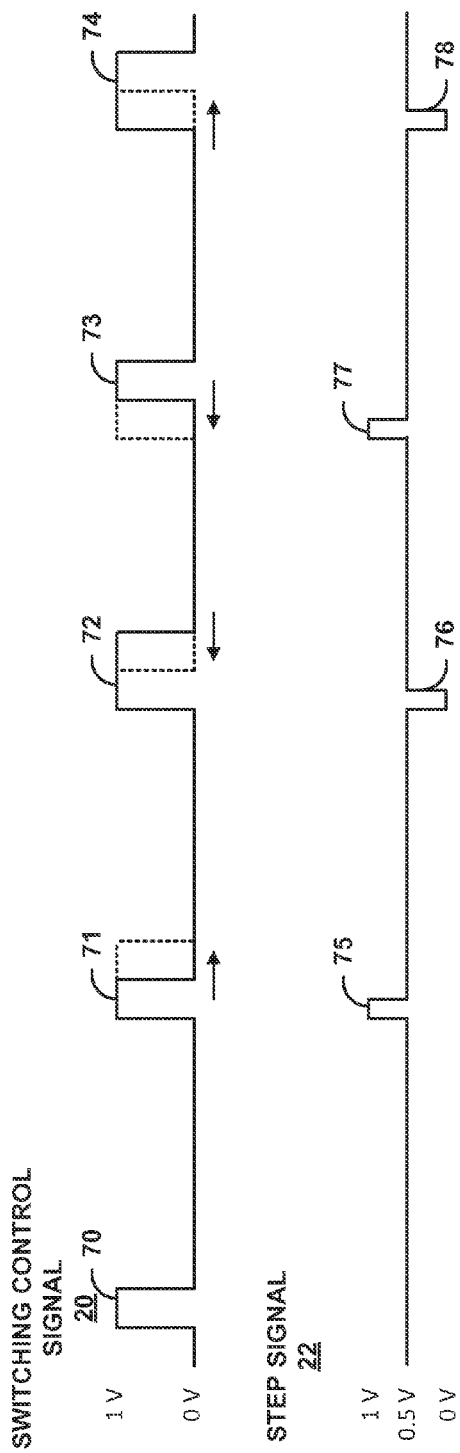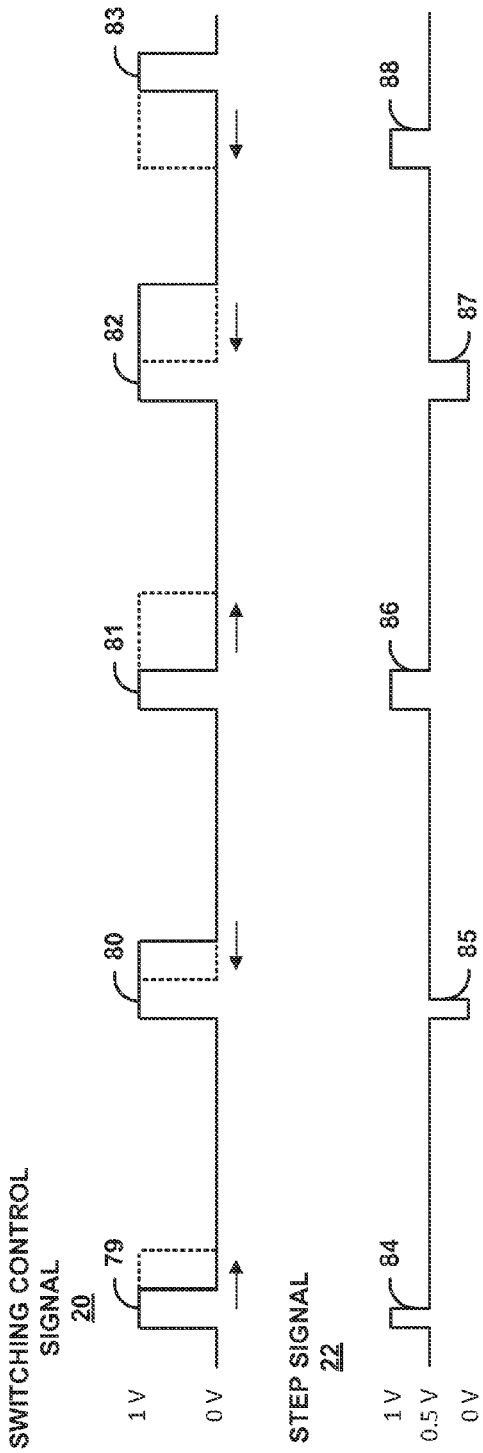

SYNCHRONIZED POWER DELIVERY

TECHNICAL FIELD

This disclosure relates to power supplies and electronic components with power management circuits.

BACKGROUND

In electronic systems, an application specific integrated circuit (ASIC), processor, or other electronic subsystem may draw varying amounts of current from power sourcing modules attached to the electronic system. These power sourcing modules may be, for example, linear or switching type power supplies supporting the power demands of the electronic system or point-of-load (POL) type power supplies supporting localized power demands within the electronic system. An increase or decrease in power demand from an electronic subsystem within the electronic system may introduce step changes in voltage or current on a power supply bus delivering the electrical power to the ASIC or electronic subsystem from the power supply. Circuitry within the power supply detects any increase or decrease in the power drawn by the ASIC or electronic subsystem and, in response, activates an internal control algorithm of the power supply to provide the required electrical power after some delay depending on the detection circuit and the control algorithm. Prior solutions have employed detection circuitry with inefficient noise margins, overdesigned current capacity, and expensive components to minimize any voltage transient which may result from responding as fast as possible once a change to the power being drawn by the electronic subsystem is detected.

SUMMARY

In general, techniques are described herein in which power demand requests from electronic components are synchronized with control algorithms internally used by the power supply to deliver power. For example, a power manager for an electronic component, such as an application specific integrated circuit (ASIC), synchronizes any request for a change in supply power with control algorithms used internally by a power supply to deliver electrical power to the electronic component. An internal control signal for the power supply, such as a pulse width modulated control signal, may be exposed and provided to one or more load electronic components that receive power from the power supply. The power manager synchronizes or otherwise controls the timing of any power change request based on timing characteristics of the control signal. In this way, the power supply may be viewed as a discrete time energy transfer device that can be synchronized with step changes in power requirements for the electronic components. This may reduce or minimize the energy and time needed to respond to dynamic load changes required by an ASIC, processor, or other electronic subsystem.

The techniques described herein may be especially useful in applications where an electronic component or other load on a power supply employs an intelligent power management circuit or controller capable of dynamically activating and deactivating circuitry to conserve power. As one example, an ASIC within a network device may utilize an internal power management circuit to selectively power off circuits within the ASIC when these circuits are not needed, thereby reducing power consumption. For example, a packet forwarding ASIC may be designed to provide 100 gigabyte per second (GB/sec) of bandwidth, and, in doing so, may draw 100 W of power. However, the ASIC may operate at only 50 GB/sec of bandwidth because of a present network load. Even though the ASIC is providing only 50 GB/sec of bandwidth, the ASIC power may typically be 90% of the maximum rating, or 90 W for a 100 W rated ASIC, unless power saving mechanisms are utilized. An internal power management circuit of the ASIC may detect lower network loading conditions and reduce ASIC power by powering off unused circuits. The packet forwarding ASIC may, in this example, process network traffic at a rate of 60 GB/sec vs. the maximum 100 GB/sec, thereby satisfying present network bandwidth conditions and saving power.

In accordance with the techniques described herein, the power management circuit may control the timing of activation and deactivation of the circuits synchronously with timing characteristics of the PWM control signals from the power supply. For example, any change to the power requirements may be timed, based on the PWM signal, so that a PWM controller within the power supply may respond faster than if current and voltage detection circuitry were used to detect the current step change. The faster response time may allow larger power changes from the ASIC to be processed. Also, lower amounts of energy storage (capacitors) may be needed to reduce board costs, and tighter voltage regulation may be maintained to reduce ASIC power and improve ASIC timing and noise performance.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 3A, 3B, and 3C are timing diagrams illustrating example techniques described herein.

DETAILED DESCRIPTION

Figure 1:
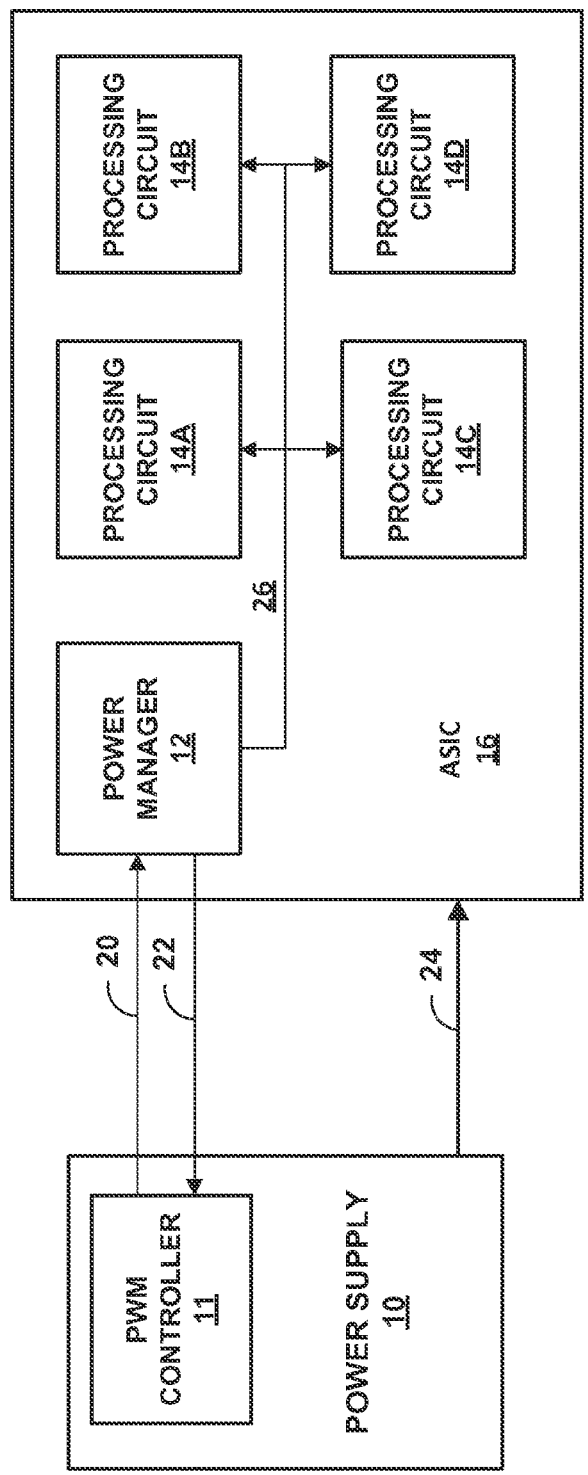
FIG. 1 is a block diagram illustrating an example of an electronic system power demand requests from electronic components are synchronized with control algorithms internally used by the power supply to deliver power in accordance with one or more examples described in this disclosure.

FIG. 1 is a block diagram illustrating an example of an electronic system in which power supply 10 is coupled to application specific integrated circuit (ASIC) 16. As shown in the example of FIG. 1, ASIC 16 includes a plurality of internal processing circuits 14A-14D (herein, "processing circuits 16") that are consume electrical power from power supply output 24. In one example, power supply 10 is a DC/DC switching power supply 10 that supplies switched DC power to ASIC 16 via regulated power supply output 24. In this example, power supply 10 includes an internal pulse-width modulated (PWM) controller 11 that applies PWM control to regulate and control the DC power delivered by power supply output 24.

In addition, ASIC 16 includes power manager 12 capable of selectively activating and deactivating any of processing circuits 14 based on current conditions and requirements of ASIC 16. For example, ASIC 16 may be a packet processing unit within a network device having packet queuing and switching components as processing circuits 14. In this example, internal power manager 12 may monitor current packet processing loads required by ASIC 16 and may activate or deactivate (e.g., place in sleep mode) any processing circuits 14A-14D. Although shown as internal to ASIC 16, power manager 12 may be internal or external to ASIC 16. Moreover, ASIC 16 represents any electrical system having processing circuits that receive power from a power supply.

Any change in operating mode of processing circuits 14A-14D in ASIC 16 may result in a change in power draw of the ASIC on power supply 10 which may in turn produce fluctuations in the voltages and currents supplied to the ASIC by the power supply on regulated power supply output 24. For example, when one or more of processing circuits 14 are powered off to reduce bandwidth, a negative step change in current flow on power supply output 24 may be seen by power supply 10. In another example, a positive step change in current may occur if one or more of processing circuits 14 are powered on to support increased bandwidth. In accordance with the techniques described herein, ASIC 16 synchronizes any change in power requirements with the internal timing of the control algorithm applied by PWM controller 11. For example, as shown in the example of FIG. 1, power supply 10 exposes a switching control signal 20 to power manager 12 for synchronizing any change in power requirements to the timing of PWM controller 11. As one example, switching control signal 20 may be a clock signal having clock transitions that are synchronized to the internal PWM switching timing of PWM controller 11 for providing regulated DC power. In another example, switching control signal 20 is an actual PWM control signal used within PWM controller 11 to control output of the DC power, where the clock transitions of the switching control signal are the transitions of the PWM control signal.

In any case, power manager 12 uses switching control signal 20 to synchronize the activation and deactivation of processing circuits 14 which the timing of PWM controller 11. For example, power manager 12 may control the timing of any change in operational state of any of processing circuits 14 such that any change in power draw on power supply output 24 falls at a point in time within a duty cycle of PWM controller 11 (e.g., near a beginning of a new duty cycle) where power supply 10 can quickly if not nearly instantaneously respond. As explained in further detail below, such synchronization may have certain advantages. For example, this may minimize or avoid, for example, operating processing circuits 14 in a mode where they receive insufficient power from power supply output 24.

In one example implementation, power manager 12 outputs any needed power change request in the form of step signal 22 in synchronization with the timing of PWM controller 11 as conveyed by switching control signal 20. In this example, power manager 12 outputs step signal 22 as explicit notification to PWM controller 11 of a need for an increase or decrease in the energy provided by power supply 10 on regulated power supply output 24 to ASIC 16. power manager 12 then activates or deactivates any processing circuit 14 at that time, or at a calculated earlier or later time offset. In a second example implementation, power manager 12 need not output step signal 22 but instead synchronizes the activation or deactivation of processing circuits 14 to the timing information carried by control signal 20 and relies on detection circuitry within power supply 10 to react to the change in power draw.

Synchronization of power manager 12 to timing of PWM controller 11 may provide certain advantages. For example, the synchronized power changes of ASIC 16 to PWM control output 20 may result in faster response of power supply 10 to the current step changes of ASIC 16 and help to maintain the regulated power output 24 voltage within the operating limits set for the ASIC. That is, direct synchronization of ASIC 16 current steps with PWM controller 11 may result in a faster response time, which in turn may allow larger current steps from the processing circuits 14A-14D to be processed more quickly by power supply 10. This may be useful in environments, such as network switching and routing, where high bandwidth rates must be maintained and processing loads may change quickly. For example, a response time to load changes for a power supply of a few milliseconds may be acceptable for some electronic system applications, but not fast enough for network equipment where gigabit line rates need to be maintained. In such applications, a response time to load changes of a few milliseconds, and therefore a several milliseconds in activating additional packet processing circuits, may already exceeds the tolerance level in network equipment applications.

As another example, a smaller voltage transient may result on regulated power supply output 24 by synchronizing power draw changes of ASIC 16 to PWM control output 20 than if PWM controller 11 of DC/DC power supply 10 power supply 10 had to detect a voltage or current change (transient) first before activating a control algorithm.

Further, by synchronizing current step changes of ASIC 16 directly to switching control signal 20 of power supply 10, power manager 12 may reduce the complexity of any DC/DC power supply point of load (POL) control by reducing or eliminating additional circuits and firmware previously needed to detect changes to power drawn on power supply output 24. For example, power manager 12 reduces over-design of POL elements such as total phase count. power manager 12 may also reduce the need for complex coupled inductors and extra capacitors as well as the need for higher switching frequency to minimize the transient resulting from the delay in detecting and responding to current step changes on regulated power supply output 24. By minimizing the transient and allowing tighter control of voltage regulation, power manager 12 enables ASIC designers to improve ASIC 16 power consumption, speed (timing), and noise margins. Additionally, lower amounts of energy storage (bulk capacitors) may be needed by power supply 10 which may reduce component costs and printed circuit board (PCB) area. A tighter voltage regulation window of regulated power supply output 24 may also be maintained which may reduce ASIC 16 power and provide ASIC designers with more voltage margin to meet timing and noise margins. This may be useful for a variety of reasons. For example, under a high processing load, ASIC 16 may draw power from power supply 10 at a lower voltage (higher current) than rated for the ASIC, and under a low processing load, the ASIC may draw power at a higher voltage (lower current) than rated. In some cases, the low and high power voltage variations may be −10% and +10%, respectively, for a total variation of 20%. Power supply 10 voltage variations may affect the power consumption characteristics of ASIC 16. For example, a 1% drop in power supply 10 voltage may create a 3% increase in ASIC 16 power consumption, whereas a 10% supply voltage drop may provide a 30% power increase in ASIC 16. Power supply 10 voltage variations may therefore produce additional power draw from ASIC 16 without a corresponding improvement in the processing speed of the ASIC. The packaging of ASIC 16 may also set limits on the ASIC power consumption which is usually +10% above the typical maximum power consumption.

Figure 2:
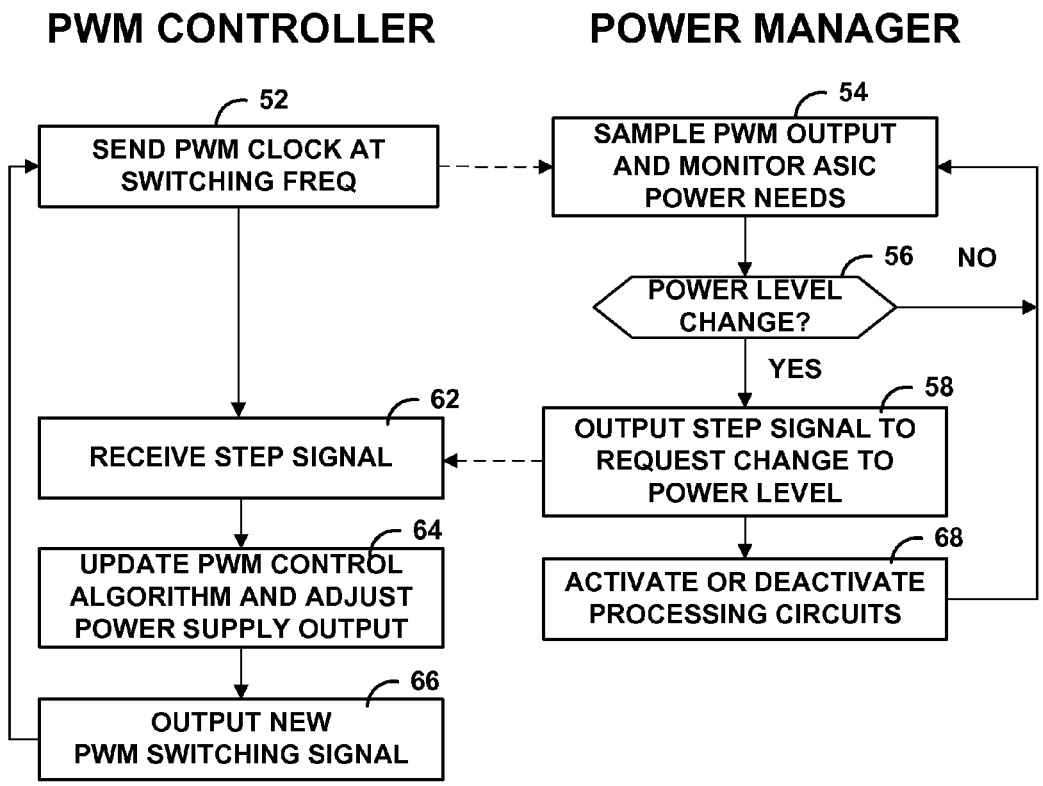
FIG. 2 is a flowchart providing a high-level overview of the techniques described herein.

FIG. 2 is a flowchart providing a high-level overview of the techniques described herein. For purpose of example, the flowchart of FIG. 2 is described with respect to the components of FIG. 1.

In the example flowchart of FIG. 1, PWM controller 11 of power supply 10 transmits switching control signal 20 (e.g., a PWM clock) at regular intervals so as to provide timing information for the switching frequency and duty cycle of the internal PWM control algorithm (52). Power manager 12 receives and acquires (e.g., latches) switching control signal 20 (54).

At some point, power manager 12 detects a need to change an operational state (i.e., activate or deactivate) one or more processing circuits 14 of ASIC that will result in a change in power demand from power supply 10 (56). In this event, power manager 12 may output step signal 22 to indicate a required change in demand for electrical power on power supply output 24(58). Power manager 12 may control the timing of step signal 22 so as to synchronize the request with the timing information determined from switching control signal 20. For example, as explained in further detail below, power management 12 may time the output of step signal to be synchronous with (e.g., substantially at of before) a transition to a next switching interval of PWM controller 11, thereby reducing the time for the PWM controller to react to the power change. In some embodiments, power management 12 may output step signal 22 early, e.g., in the middle of a switching interval of PWM controller 11, in embodiments where the PWM controller may preemptively terminate the current switching interval and initiate the next switching interval based on the newly requested level of power. Step signal 22 may take the form of discrete pulses to step up or step down the current power level. As other examples, step signal may convey an analog voltage indicative of a current level of demand for electrical power from power supply 11. These and other examples are discussed in further detail below.

In response, PWM controller 11 receives step signal 22 and utilizes the received request to update the PWM control algorithms applied by the PWM controller (62, 64). That is, PWM controller 11 may change one or more characteristics of the PWM control signal used internally within power supply 11 to provide regulated power. For example, PWM controller 11 may expand or contract any positive phase of an internal PWM signal, thereby changing the duty cycle and resulting in more or less electrical power being driven to power supply output 11. In some cases, PWM controller 11 may utilize step signal 22 to increment or decrement an internal counter utilized in generating the internal PWM control signal. In some example, PWM controller 11 may modify a switching interval in response to a request on step signal 22, such as by shifting in time the occurrence of the next switching interval or by changing a period of the interval itself.

In any event upon updating the internal control algorithm, PWM controller 11 outputs an adjusted power level on power supply output 24 (64) and outputs switching control signal 20 in modified form to reflect any change to the timing of internal PWM control signals (66). In addition, power manager 12 activates or deactivates processing circuits 14 that initially lead to the required change in power level (68). Power manager 12 may time the activation or deactivation based on the particular response time of PWM controller 11 and power supply 10, and in some cases may change the operation state of the processing circuits before or after sending the request. Moreover, as noted above, in some embodiments, power manager 12 need not output step signal 22 but may instead time the activation or deactivation of processing circuits with the timing information present on switching control signal 20.

Figure 3C:
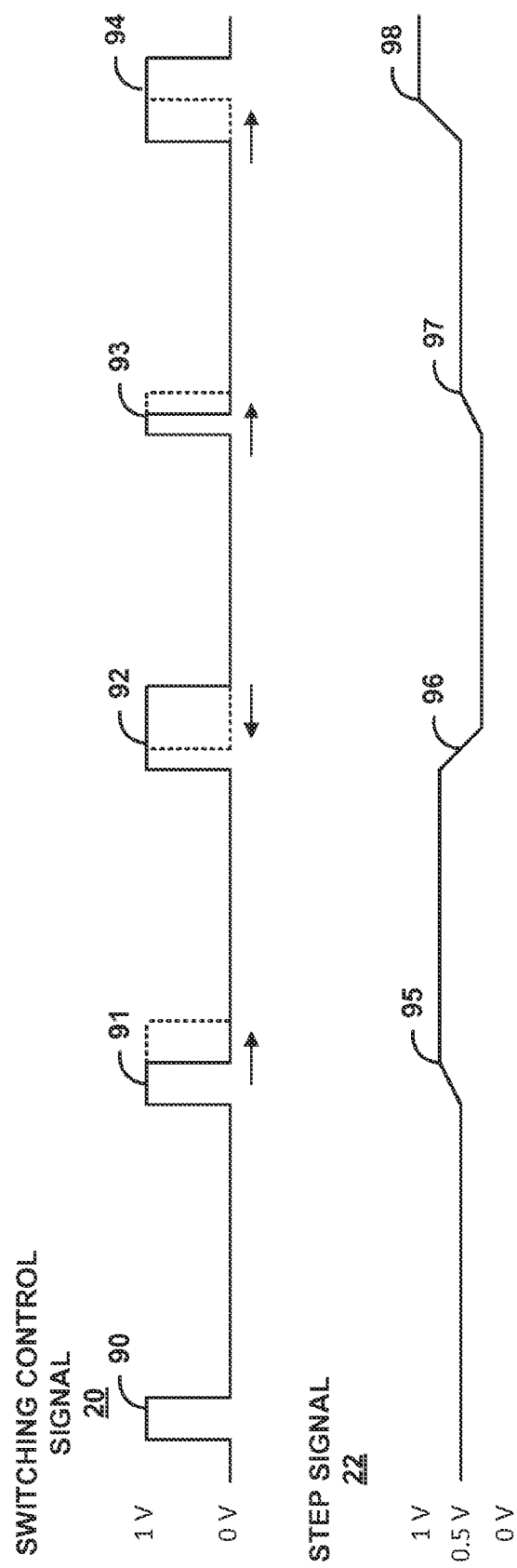

FIGS. 3A, 3B, and 3C are timing diagrams illustrating example techniques described herein. FIG. 3A, for example, shows one example embodiment in which power manager 12 outputs step signal 22 to have discrete step pulses to request increases or decreases to the amount of power delivered by power supply output 24. In the example of FIG. 3A, step signal 22 provided by power manager 12 is shown having step pulses 75-78 of a fixed amplitude and duration. Step pulses 75-78 are of fixed size to communicate from power manager 12 to PWM controller 11 that a fixed amount of energy should be added if the pulse is above the 0.5 V average voltage, and a fixed amount of energy should be subtracted if the pulse is below the 0.5 V average voltage. In this example, power manager 12 controls the timing of step pulse 75 to occur at or slightly before the switching interval and indicates that a fixed unit of energy should be added in the immediately following switching interval, as shown by PWM clock pulse 71 having an increased duty cycle within switching control signal 20. Current step pulse 76 subtracts the same unit of energy that step pulse 75 added, and PWM clock pulse 72 reverts back to the original duty cycle of switching control signal 20. Step pulse 77 shows another example in which the step pulse is fixed in size, but occurs earlier than the normal switching interval represented by PWM clock pulse 73. In this case, PWM controller 11 may control the internal timing of power supply 10 to phase shift or otherwise accelerate the next switching transition. That is, PWM clock pulse 73 may be modified by PWM controller 11 to begin earlier than the normal switching interval and with a fixed unit of energy added to the pulse. Finally, step pulse 78 illustrates an example in which the step pulse is output by power manager 12 the same amount of time earlier than the normal switching interval as step pulse 77, but a fixed amount of energy is now subtracted from PWM clock pulse 74. PWM controller 11 may subtract the fixed amount of energy that is earlier than the normal switching interval, and PWM clock pulse 74 reverts to the normal switching interval.

FIG. 3B illustrates another example embodiment in which power manager 12 outputs step signal 22 to have step pulses of a fixed amplitude but a variable duration. That is, in FIG. 3B, a second method is used where step pulses 84-88 may be variable in duration and overall size, thus allowing PWM controller 11 to add a variable amount of energy to switching control signal 20. In the first example, step pulse 84 may be the same size as step pulse 75 (FIG. 3A) which is of fixed size; therefore, step pulse 84 indicates to PWM controller 11 that the same amount of energy should be added to PWM clock 20 as with step pulse 75. In this case, PWM clock pulse 79 shows the same increase in energy as PWM clock pulse 71. Likewise, variable size step pulse 85 is the same size as fixed size step pulse 76, and both pulses indicate to PWM controller 11 to subtract the same amount of energy from PWM clock 20. The resultant size of PWM clock pulse 80 is then the same size as PWM clock pulse 72.

In another example, variable size step pulse 86 is larger than fixed size step pulse 75. In this case, PWM controller 11 adds more energy to switching control signal 20 than for step pulse 75, and the resultant PWM clock pulse 81 is larger than PWM clock pulse 71. In the same way, step pulse 87 is larger than step pulse 76, and PWM controller 11 subtracts a larger amount of energy from PWM clock pulse 82 than from PWM clock pulse 72. The remaining variable size step pulse 88 occurs earlier than the normal switching interval. In this case, PWM controller 11 may add more energy to PWM clock 20 earlier in the cycle, and the resultant PWM clock pulse 83 may have its duty cycle increased before the regular switching interval for PWM clock 20.

FIG. 3C shows yet another example mode in which an analog level of step signal 22 is used to indicate the amount of energy to be added or subtracted from switching control signal 20. In FIG. 3C, a difference between a nominal set point voltage of 0.5 V and the actual voltage of step signal 22 represents an amount of energy to increase or decrease in switching control signal 20 away from a nominal PWM power setting. For example, step signal 22 at voltage level 95 indicates an increase above the set point level and a corresponding increase of energy in PWM clock pulse 91. Likewise, a decrease below the set point level by voltage level 96 of step signal 22 indicates a decrease below the nominal energy for PWM clock pulse 92. Voltage level 97 of step signal 22 indicates a return to the set point level, and PWM clock pulse 93 returns to the nominal size and energy for PWM clock pulse 93 represented by PWM clock pulse 90. Finally, voltage level 98 indicates an increased voltage level that occurs earlier than the normal switch interval of switching control signal 20. A corresponding increase in the energy of PWM clock pulse 94 is seen, and this clock pulse occurs earlier in the PWM switching cycle than a regular PWM clock 20 pulse.

Figure 4:
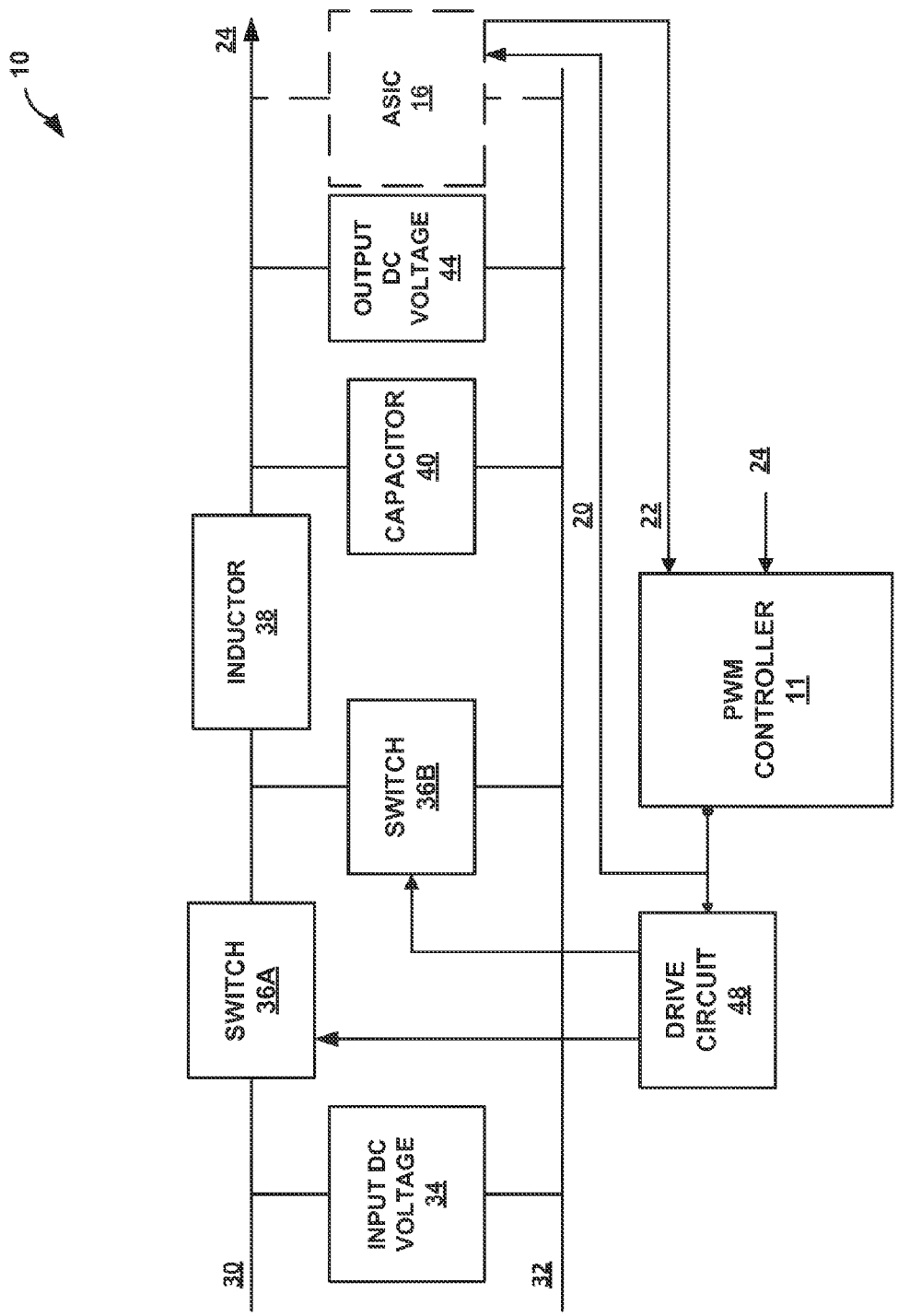
FIG. 4 is a block diagram illustrating an example of a point of load (POL) DC/DC switching power supply.

FIG. 4 is a block diagram illustrating an example of power supply 10 with PWM controller 11 in greater detail. In the example of FIG. 4, power supply 10 is a DC/DC switching power supply that supplies switched DC power via regulated power supply output 24. Input DC voltage 34 is presented at input DC voltage terminal 30 and ground terminal 32. Power supply 10 includes switch 36A and switch 36B which may shunt input DC voltage 34 to inductor 38 or to ground terminal 32. Drive circuit 48 provides drive voltage to operate switch 36A and switch 36B in response to control signals from PWM controller 11. PWM controller 11 uses power supply output 24 in closed-loop feedback control, where the power supply output is indicative of output DC voltage 44 across capacitor 40 and a load, such as ASIC 16. PWM controller 11 transmits switching timing information about power supply 10 to ASIC 16 via switching control signal 20 and receives control information from the ASIC via step signal 22.

In this example, the main function of inductor 38 is to limit the current slew rate through switch 36A. This action limits the otherwise high peak current that would be limited by the resistance of switch 36A alone. Inductor 38 in power supply 10 also stores energy to increase the efficiency of the switching power supply. A linear regulator uses a resistive drop to regulate the voltage, losing power, which equals the voltage drop times the current, in the form of heat. Inductor 38 of power supply 10 does have a voltage drop and an associated current, but the current is 90 degrees out of phase with the voltage and, therefore, the inductor's voltage drop times the inductor's current does not contribute to power loss. Because of this, the energy of inductor 38 remains stored in inductor 38 and can be recovered in the discharge phase of the switching cycle of power supply 10 which results in much higher efficiency and less heat. PWM controller 11 may adjust the timing of switching control signal 20 to drive circuit 48 for greater efficiency based on information received from ASIC 16 on step signal 22.

Power supply 10 uses switch 36A, switch 36B, inductor 38, and capacitor 40 to transfer energy from input DC voltage 34 to output DC voltage 44 and the load, e.g., ASIC 16. The basic components switch 36A, switch 36B, and inductor 38 may be rearranged to form a switching regulator which is a step-down (buck), step-up (boost), or an inverter (flyback). For the purposes of the POL switching power supply of this invention, we will describe the step-down (buck) circuit. Feedback and control circuitry such as PWM controller 11 may be nested around the basic step-down switching circuit to regulate the energy transfer and maintain a constant output within normal operating conditions.

In continuous mode for a step-down version of power supply 10, the current through inductor 38 does not drop to zero during the commutation cycle. When switch 36A is closed (ON state) by drive circuit 48, the current through inductor 38 rises linearly. In this state, drive circuit 48 maintains switch 36B in an open condition, and no current flows through switch 36B. In the next state, switch 36A is opened (OFF state) and switch 36B is closed by drive circuit 48, and the current through inductor 38 decreases linearly. In step-down regulation, the energy stored in inductor 38 increases during the ON state as inductor 38 current increases, and then energy stored in inductor 38 decreases during the OFF state as inductor 38 current decreases. Thus, the energy from input DC voltage 34 is transferred through inductor 38 to the output DC voltage 44 and load 42. For steady state operation with no circuit losses, output DC voltage 44 equals Input DC voltage times the duty cycle D, where D has a value between 0 and 1. It can be seen that output DC voltage 44 varies linearly with the duty cycle D for a given input DC voltage 34. Because output DC voltage 44 may be less than or equal to input DC voltage 34, the circuit for DC/DC power supply 10 is referred to as a step-down converter. The techniques described herein may be used to modify the basic operation of the step-down converter for finer control of the charge/discharge cycle of inductor 38 in order to reduce switching transients.

For high efficiency, power supply 10 may employ a transistor rather than a diode for switch 36B to complete the switching function in the step-down converter. For example, a metal-oxide-semiconductor field-effect transistor (MOSFET) may be used for switch 36B, and switch 36B may be referred to as a synchronous rectifier switch. When main switch 36A is closed, synchronous rectifier switch 36B is open, and when the main switch is open, the synchronous rectifier switch is closed. To prevent cross conduction where both switch 36A and switch 36B are on at the same time, a break-before-make switching scheme may be used. Because of this, a diode may still be used to conduct during the interval between the opening of main switch 36A and the closing of synchronous rectifier switch 36B. This interval may be referred to as the dead time. When a MOSFET is used for synchronous rectifier switch 36B, the current normally flows in reverse, from source to drain, and this allows the MOSFET's integrated body diode to conduct during the dead time. When synchronous rectifier switch 36B closes, the current flows through the MOSFET channel. PWM controller 11 adjusts the signal on switching control signal 20 to drive circuit 48 according to information received on step signal 22 from ASIC 16. Drive circuit 48 may alter timing signals to switch 36A and synchronous rectifier switch 36B according to switching control signal 20.

Changing the duty cycle of the step-down, step-up, or inverter switching power supply controls the steady state output DC voltage 44 with respect to the input DC voltage 34. The most common control method is PWM. This method takes a sample of output DC voltage 44 and subtracts this from a reference voltage maintained by PWM controller 11 based on the current target power level of power supply output 24 in view of step signal 22. This comparison establishes a small error signal Verror. This error signal may be compared to an oscillator ramp signal within PWM controller 11. A comparator within PWM controller 11 may output a digital signal on switching control signal 20 to drive circuit 48 that operates main power switch 36A and switch 36B. When Output DC voltage 44 changes, Verror also changes which causes the comparator threshold to change. As a result, the pulse width of the PWM signal on switching control signal 20 also changes. The duty cycle change of the PWM signal on switching control signal 20 moves output DC voltage 44 to reduce the error signal Verror to zero, thus completing the control loop. The switching topology described is classified as a voltage-mode controller (VMC) because the feedback regulates output DC voltage 44. Under ideal conditions, the loop gain may be considered infinite, and the output impedance for an ideal voltage source is zero at output DC voltage 44.

Another control method for power supply 10 is current-mode control (CMC). This method regulates the output current and, assuming infinite loop gain under ideal conditions, output DC voltage terminal 24 is a high impedance source. In CMC, the current loop is nested with a slower voltage loop in PWM controller 11. A ramp may be generated within PWM controller 11 by the slope of inductor 38 current, and the ramp compared with the error signal Verror, which is output DC voltage 44 subtracted from the reference voltage maintained within PWM controller 11. When load 42 needs more current and output DC voltage 44 drops, the CMC within PWM controller 11 supplies more current to the load. An advantage of CMC is its ability to manage inductor 38 current, whereas in VMC, inductor 38 current is not measured. Inductor 38 and filter capacitor 40 form a resonant tank circuit that can ring and cause oscillations in VMC. CMC senses inductor 38 current to correct for instabilities which may lead to oscillation. The techniques described herein may further improve stability beyond the VMC and CMC methods with additional control of output power from DC/DC power supply 10 based on PM current step signal 22 from ASIC 16.

In the multiphase buck converter, a number n of step-down (buck) converter circuits are placed in parallel between input DC voltage 34 and output DC voltage 44. Each of the n buck converters is turned on as one phase at n equally spaced intervals over the switching period. The multiphase buck converter circuit is typically used with the synchronous rectifier circuit described above. One advantage of the multiphase buck converter is that it can respond to changes in load as quickly as if an individual buck circuit were switched n times as fast without a corresponding increase in switching losses that would apply to a switching frequency that was n times faster. Thus, the multiphase buck converter may respond to rapidly changing loads, such as ASIC 16, in a network device. Another advantage is a significant decrease in switching ripple due to the increased effective switching frequency. This is advantageous if ASIC 16 has tight voltage ripple requirements on power supplied to the ASIC. In a multiphase buck converter, PWM controller 11 may transmit several unique PWM control signals to several parallel drive circuits 48 within power supply 10. PWM controller 11 may generate switching control signal 20 by ORing together the several internal PWM control signals into one signal. Step signal 22 from ASIC 16 to PWM controller 11 may selectively be synchronized with, and therefore adjust, several unique PWM control pulses within power supply 10, thus allowing finer control of the PWM process in a multiphase buck converter.

The techniques of this disclosure may be implemented in a variety of devices or apparatuses, including routers, switches, or other electronic equipment. Various components, modules or units are described in this disclosure to emphasize functional aspects of devices configured to perform the disclosed techniques, but do not necessarily require realization by different hardware units. Instead, various units may be combined in a hardware unit or provided by a collection of interoperative hardware units.

Various examples have been described. These and other examples are within the scope of the following claims.

The invention claimed is:

1. A method comprising:
transmitting, with a power supply to an electronic component, a switching control signal having clock transitions synchronized to a pulse width modulated (PWM) control signal within the power supply;
receiving, with the power supply from the electronic component, an electrical power change request indicating a pending power consumption change in the electronic component, wherein the received electrical power change request is synchronized with the switching control signal;
determining, with a controller of the power supply, a change in a characteristic of the PWM control signal within the power supply based upon the electrical power change request;
producing a modified PWM control signal based on the determined change in the characteristic of the PWM control signal; and
outputting a regulated amount of electrical power from the power supply, to provide power to the electronic component in accordance with the electrical power change request, based upon the modified PWM control signal.

2. The method of claim 1, wherein receiving an electrical power change request comprises receiving a signal having one or more pulses, each of the pulses representing a step change to the amount of electrical power from the power supply.

3. The method of claim 1, wherein receiving an electrical power change request comprises receiving a signal having a variable amplitude representing a magnitude for a change to the amount of electrical power from the power supply.

4. The method of claim 1, wherein determining a change in a characteristic of the control signal comprises modifying a duty cycle of the control signal with the controller of the power supply based on the electrical power change request.

5. The method of claim 1, wherein determining a change in a characteristic of the control signal comprises modifying a switching interval of the control signal with the controller of the power supply based on the electrical power change request.

6. The method of claim 1, wherein outputting a regulated amount of electrical power from the power supply comprises controlling a plurality of switches within the power supply in accordance with the modified signal.

7. A power supply comprising:
a plurality of switches coupled to an input voltage;
an output to transmit, to an electronic component, a switching signal having clock transitions synchronized to a pulse width modulated (PWM) control signal;
an input to receive, from the electronic component, an electrical power change request indicating a pending power consumption change in the electronic component, wherein the received electrical power change request is synchronized with the switching control signal; and
a controller configured to:
determine a change in a characteristic of the PWM control signal based upon the electrical power change request;

produce a modified PWM control signal based on the determined change in the characteristic of the PWM control signal; and control the plurality of switches based on the modified PWM control signal to cause the power supply to output a regulated amount of electrical power, to provide power to the electronic component in accordance with the electrical power change request.

8. The power supply of claim 7, wherein the electrical power change request comprises a signal having one or more pulses, each of the pulses representing a step change to the amount of electrical power from the power supply.

9. The power supply of claim 7, wherein the electrical power change request comprises a signal having a variable amplitude representing a magnitude for a change to the amount of electrical power from the power supply.

10. The power supply of claim 7, wherein the controller modifies a duty cycle of the control signal based on the electrical power change request.

11. The power supply of claim 7, wherein the controller modifies a switching interval of the control signal based on the electrical power change request.

12. A method comprising:
receiving, with an electronic component from a power supply, a switching control signal having clock transitions synchronized to a pulse width modulated (PWM) control signal within the power supply;
detecting, with a power manager of the electronic component, a required change in power consumption by one or more processing circuits of the electronic component;
after detecting the required change in power consumption, determining a timing for transmitting an electrical power change request, indicating a pending power consumption change in one or more processing circuits of the electronic component, based on clock transitions of the switching control signal;
transmitting, with the power manager of the electronic component to the power supply, the electrical power change request based on the determined timing; and
receiving, with the electronic component, a regulated amount of electrical power from the power supply in response to the electrical power change request.

13. The method of claim 12, wherein transmitting the electrical power change request comprises transmitting a signal having one or more pulses, each of the pulses representing a step change to the amount of electrical power from the power supply.

14. The method of claim 12, wherein transmitting the electrical power change request comprises transmitting a signal having a variable amplitude representing a magnitude for a change to the amount of electrical power from the power supply.

15. The method of claim 12, further comprising:
changing, with the power manager, an operating state of the one or more processing circuits to activate or deactivate the processing circuits.

16. An integrated circuit comprising:
a plurality of processing circuits connected to a power control bus; and
a power manager configured to:
receive, from a power supply, a switching control signal having clock transitions synchronized to a pulse width modulation (PWM) control signal within the power supply;
detect a required change in power consumption by the one or more processing circuits via the power control bus;
after detecting the required change in power consumption, determine a timing for transmitting an electrical power change request, indicating a pending power consumption change in one or more processing circuits of the electronic component, based on clock transitions of the switching control signal; and
transmit to the power supply the electrical power change request to the power supply based on the determined timing; and
a power supply input configured to receive regulated electrical power from the power supply in response to the electrical power change request.

17. The integrated circuit of claim 16, wherein the power manager transmits the electrical power change request as a signal having one or more pulses, each of the pulses representing a step change to the amount of electrical power from the power supply.

18. The integrated circuit of claim 16, wherein the power manager transmits the electrical power change request as a signal having a variable amplitude representing a magnitude for a change to the amount of electrical power from the power supply.

* * * * *